United States Patent
Winter et al.

(10) Patent No.: US 6,860,547 B2
(45) Date of Patent: Mar. 1, 2005

(54) BODY ASSEMBLY AND METHOD OF MAKING SAME

(75) Inventors: Fred Winter, Rutesheim (DE); Heinz Eberhardt, Weissach (DE); Franc Praznik, Leonberg (DE); Frank Sautter, Reutlingen (DE); Roberto Oggianu, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/633,305

(22) Filed: Aug. 4, 2003

(65) Prior Publication Data

US 2004/0113462 A1 Jun. 17, 2004

(30) Foreign Application Priority Data

Aug. 2, 2002 (DE) .......................................... 102 35 382

(51) Int. Cl.$^7$ .......................... B62D 23/00; B60K 37/00
(52) U.S. Cl. ............. 296/193.02; 296/205; 296/203.02; 296/187.09; 296/70; 180/90
(58) Field of Search ....................... 296/193.02, 193.09, 296/205, 203.02, 187.09, 187.03, 203.01, 181.4, 70, 72; 180/90

(56) References Cited

U.S. PATENT DOCUMENTS

| | | | | |
|---|---|---|---|---|
| 5,320,403 A | * | 6/1994 | Kazyak | ................. 296/203.01 |
| 5,562,329 A | | 10/1996 | Srock et al. | ................. 296/203 |
| 5,839,776 A | * | 11/1998 | Clausen et al. | ......... 296/187.03 |
| 5,934,733 A | * | 8/1999 | Manwaring | ................... 296/72 |
| 5,992,925 A | * | 11/1999 | Alberici | ................. 296/203.02 |
| 6,179,372 B1 | * | 1/2001 | Sakamoto et al. | ..... 296/203.02 |
| 6,209,948 B1 | * | 4/2001 | Mori et al. | ............ 296/187.09 |
| 6,517,139 B2 | * | 2/2003 | Sutou et al. | .................. 296/70 |
| 6,663,166 B2 | * | 12/2003 | Achleitner | ............... 296/146.6 |
| 2004/0066062 A1 | * | 4/2004 | Awano et al. | .......... 296/203.02 |

FOREIGN PATENT DOCUMENTS

| DE | 44 22 498 | 1/1995 |
|---|---|---|
| EP | 0836983 A2 | 4/1998 |

* cited by examiner

Primary Examiner—Patricia L. Engle
(74) Attorney, Agent, or Firm—Crowell & Moring LLP

(57) ABSTRACT

A passenger car is configured with a dashboard installed between a front of the car and a passenger compartment. At least two front longitudinal beams are installed at a distance from each other and are connected to this dashboard, lateral exterior frontwalls, a floor and upright A-columns. In the area of the dashboard, a support structure is provided by means of which the front longitudinal beams are connected to the upright A-columns, the frontwalls, the dashboard and the center tunnel as power transmitters. A support structure with an increased energy absorption potential that can be produced at low costs, and which is provided in the area of the dashboard, is created so that the support structure is realized as a rigid tubular frame which is installed on the dashboard facing the passenger compartment, whereby the tubular frame is connected with at least the dashboard, the A-columns and the subjacent frontwalls.

42 Claims, 9 Drawing Sheets

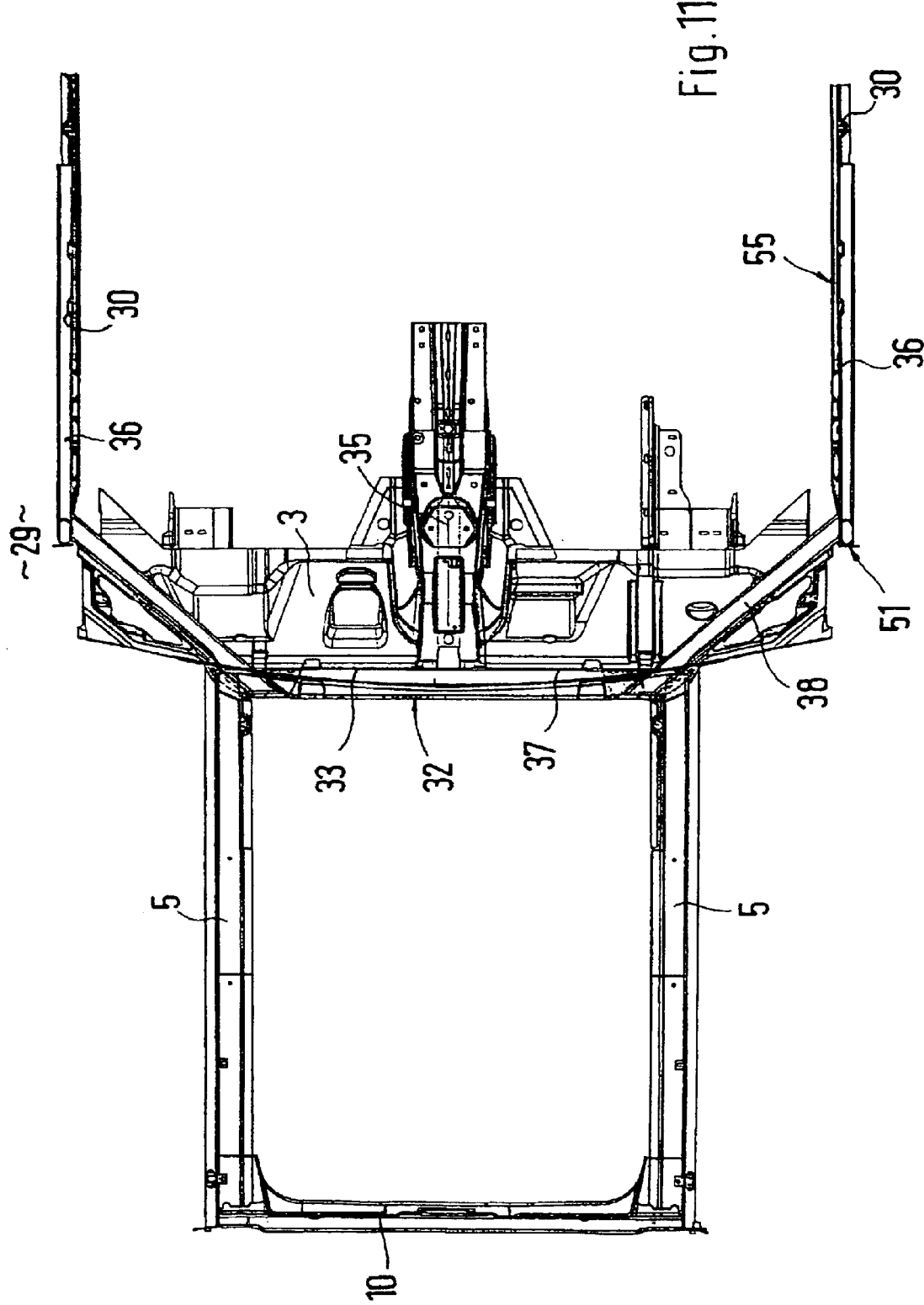

BODY ASSEMBLY AND METHOD OF MAKING SAME

BACKGROUND OF THE INVENTION

This application claims the priority of German Patent No. 102 35 382.4 filed Aug. 2, 2002, the disclosure of which is expressly incorporated by reference herein The invention relates to a configuration of a passenger car body assembly. Preferred embodiments of the invention relate to a configuration of a passenger car comprising a dashboard installed between a front of the car and the passenger compartment; at least two front longitudinal beams that are connected to the dashboard at a distance from each other; lateral exterior frontwalls, a floor and upright A-columns, with a dashboard between a front of the car and the passenger compartment, wherein at least two front longitudinal beams are connected to the dashboard at a distance from each other and having lateral exterior frontwalls, a floor and upright A-columns, wherein a support beam structure is provided in an area of the dashboard by means of which the front longitudinal beams are connected as power transmitters to the upright A-columns, the frontwalls, the dashboard and the center tunnel.

German Patent Document DE 44 22 498 C1 (corresponding U.S. Pat. No. 5,562,329) describes a configuration of a passenger car with a dashboard installed between the front of the car and the passenger compartment, with at least two front longitudinal beams installed at a distance from each other that are connected to the dashboard with lateral exterior frontwalls, a floor, and upright A columns, whereby a support structure is provided in the area of the dashboard, by means of which the front longitudinal beams are connected to the upright A-columns, the frontwalls, the dashboard and the center tunnel as power-transmitters.

In this arrangement, the two front rectilinear longitudinal beams are lead through to the dashboard and are connected as power-transmitters with this and a first exterior cross member placed on the dashboard. Furthermore, a second cross member is provided at the level of the front longitudinal beams on the side of the dashboard that faces the passenger compartment, which is realized by the dashboard and a hat-shaped profiled molded sheet metal part placed thereon. In inclined exterior areas, the second cross member divides into two juxtaposed hollow beams. The upper hollow beam section is connected to the interior side of the upright A-column, whereas the lower hollow beam section is connected to the interior side of the frontwall or the floor.

The disadvantage of this arrangement lies in the fact that, on the one hand, the production of the molded sheet metal parts forming the beam structure involves high tooling costs, and, on the other hand, that support structures made from molded sheet metal parts have only a limited energy absorption potential in case of a collision.

The invention is based on the problem of enhancing the realization of a support structure of a passenger car in the area of the dashboard in such a way that it provides a distinctly higher energy absorption potential with cost-efficient production, in order to satisfy higher collision requirements.

According to preferred embodiments of the invention, this problem is resolved by providing a configuration of a passenger car with a dashboard between a front of the car and the passenger compartment wherein at least two front longitudinal beams are connected to the dashboard at a distance from each other and having lateral exterior frontwalls, a floor and upright A-columns, wherein a support beam structure is provided in an area of the dashboard by means of which the front longitudinal beams are connected as power transmitters to the upright A-columns, the frontwalls, the dashboard and the center tunnel, wherein the beam structure is formed by a rigid tubular frame which is installed at the passenger compartment facing side of the dashboard, said tubular frame being connected at least with the dashboard, the A-columns and the frontwalls Further advantageous features of preferred embodiments of the invention are described herein and in the claims. Important advantages achieved by certain preferred embodiments of the invention are that the energy absorption potential in case of a collision are considerably increased through the realization of the support structure as a rigid tubular frame, on the one hand, and the reduced tooling costs, on the other hand. The tubular frame can be produced at low cost and can easily be integrated into the configuration. The cross tube of the tubular frame acts as a rigid bending beam that is effectively supported by a central support tube at the center tunnel and via lateral support tubes at the A-column, or the low-lying frontwalls.

According to certain preferred embodiments of the invention, in a realization of the cross tube in several parts, the side parts are inserted into the center part, whereby, in the connecting areas of the side parts with the center part, additional cast nodes are inserted into the center part, which nest the side parts in a guided manner.

According to certain preferred embodiments of the invention, by means of the tubular frame, which is preferably produced from high-strength tubes, energy absorption can be increased by about 30 percent at the same weight. Furthermore, in case of a crash impact through the tubular frame, the depth of penetration into the floor is considerably reduced. By mounting the cross tube of the tubular frame in a recess-shaped seat of the dashboard according to certain preferred embodiments of the invention, floor space is increased for the passengers. The angled lateral support tubes relieve the A-column/frontwall-node, and provide for an extremely effective support of the A-column at the lower-lying frontwall according to certain preferred embodiments of the invention. The lateral support tubes—seen in lengthwise direction—preferably extend to a seat cross member installed on the floor, which is at a relatively great distance from the dashboard according to certain preferred embodiments of the invention.

By using tailored blanks at least for the interior parts of the front longitudinal beams, a clean folding of the front longitudinal beams is guaranteed in case of a crash impact. U-shaped spacers inserted on the interior side of the front trunk trough, together with the trunk trough, form a sandwich floor, which thus forms a lower load plane for the absorption of the deformation energy.

Other objects, advantages and novel features of the present invention will become apparent from the following detailed description of the invention when considered in conjunction with the accompanying drawings.

BRIEF DESCRIPTION OF THE DRAWINGS

FIG. 11 is a partial view of the forward structure of the passenger car showing the shift tubular frame.

DETAILED DESCRIPTION OF THE DRAWINGS

Figure 1:
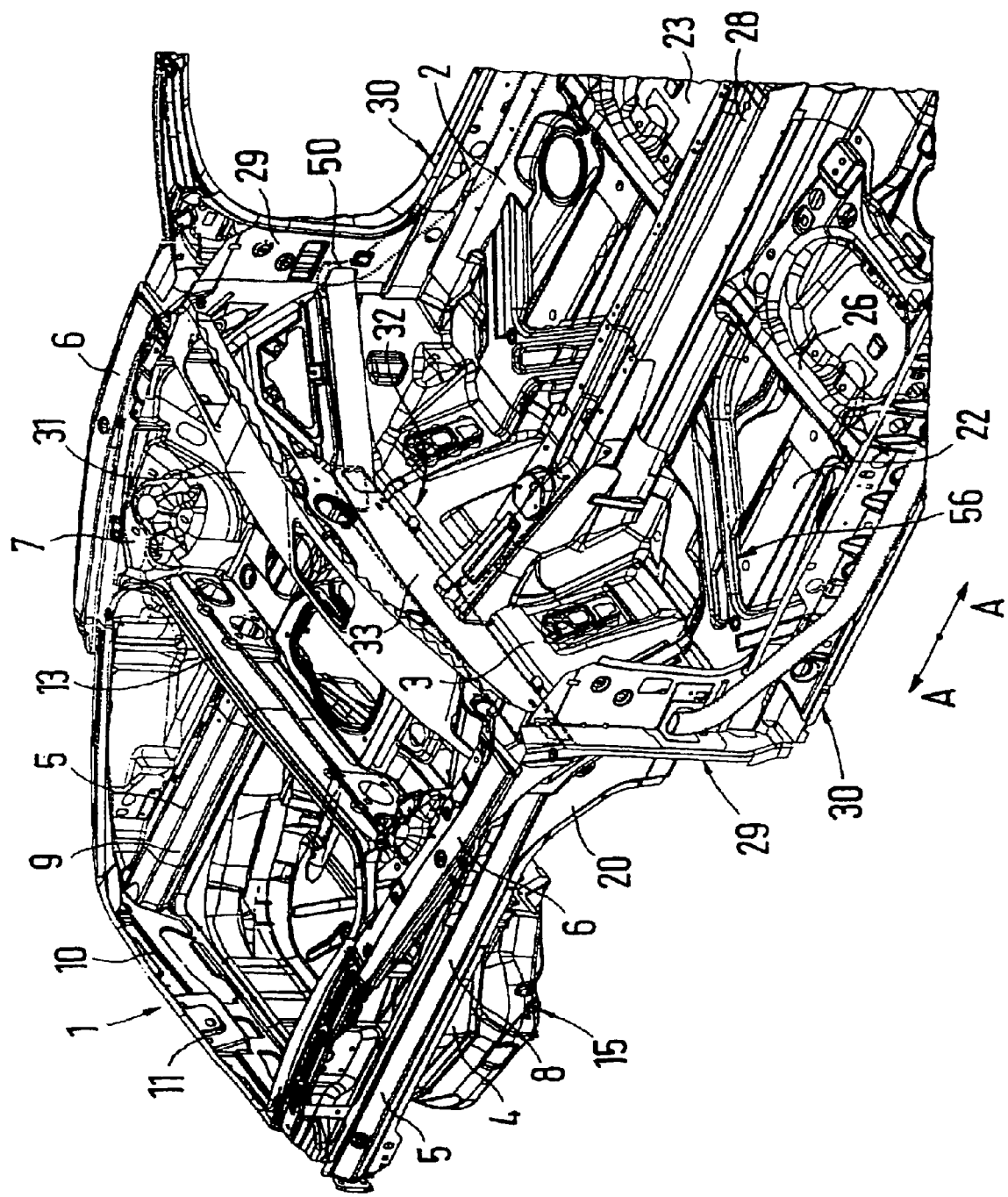
FIG. 1 is a diagonal perspective view from the back onto a frontal configuration of a passenger car body constructed according to a preferred embodiment of the present invention.

The front configuration 1 of a passenger car is essentially formed by a dashboard 3, which delimits a passenger compartment 2, and fender walls 4, which run in lengthwise vehicle direction A—A. A lower frontal longitudinal beam 5 and an upper frontal longitudinal beam 6 are connected on each fender wall 4. Furthermore, a McPherson strut seat 7 is provided in the area of each fender wall 4. The parts shown in FIGS. 1–4 which do not have associated reference characters are included to show the environment of the invention and are not further described herein.

Figure 2:
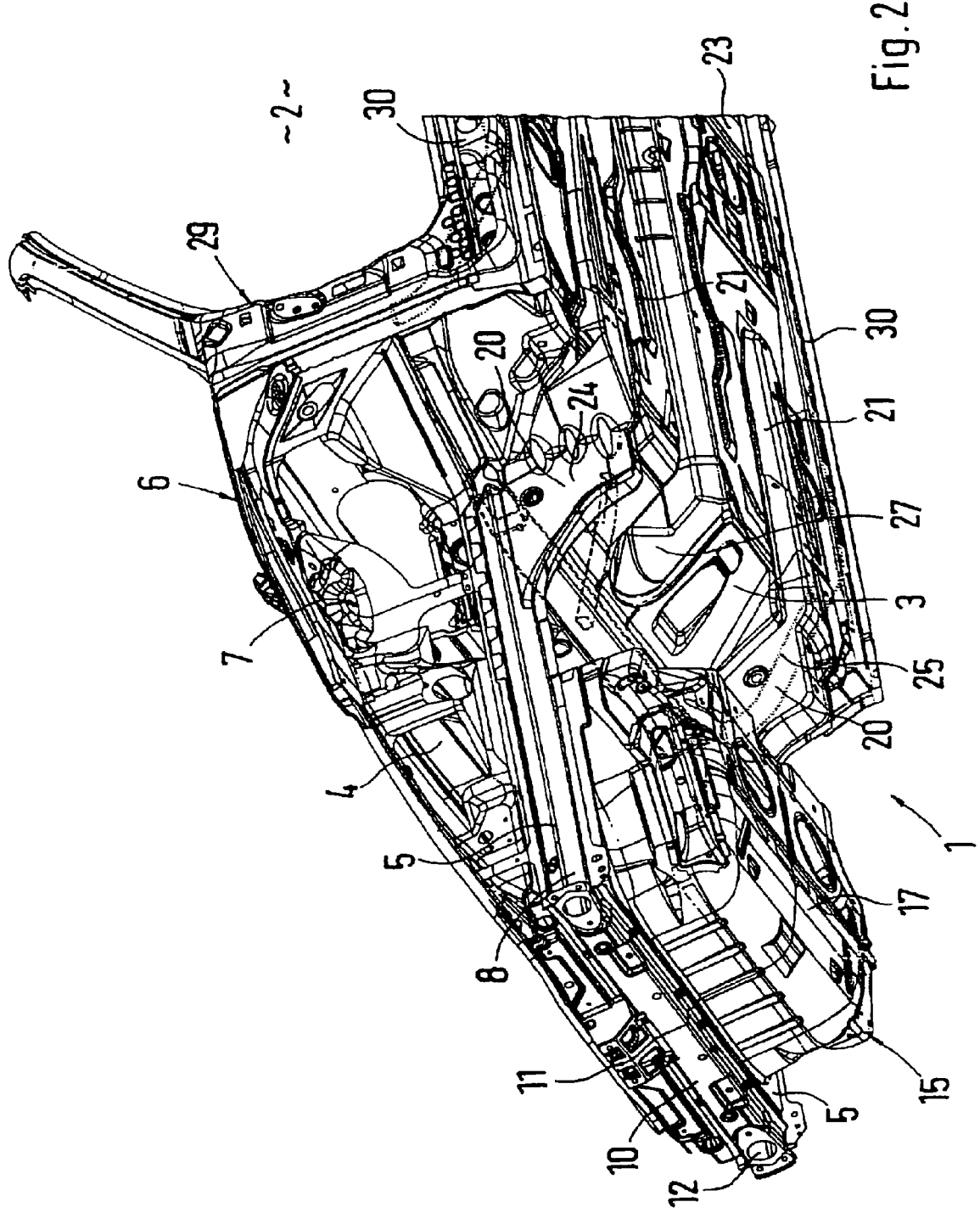
FIG. 2 is a perspective cutaway partial view from the diagonal in front and below onto the frontal configuration of the passenger car of FIG. 1.
Figure 3:
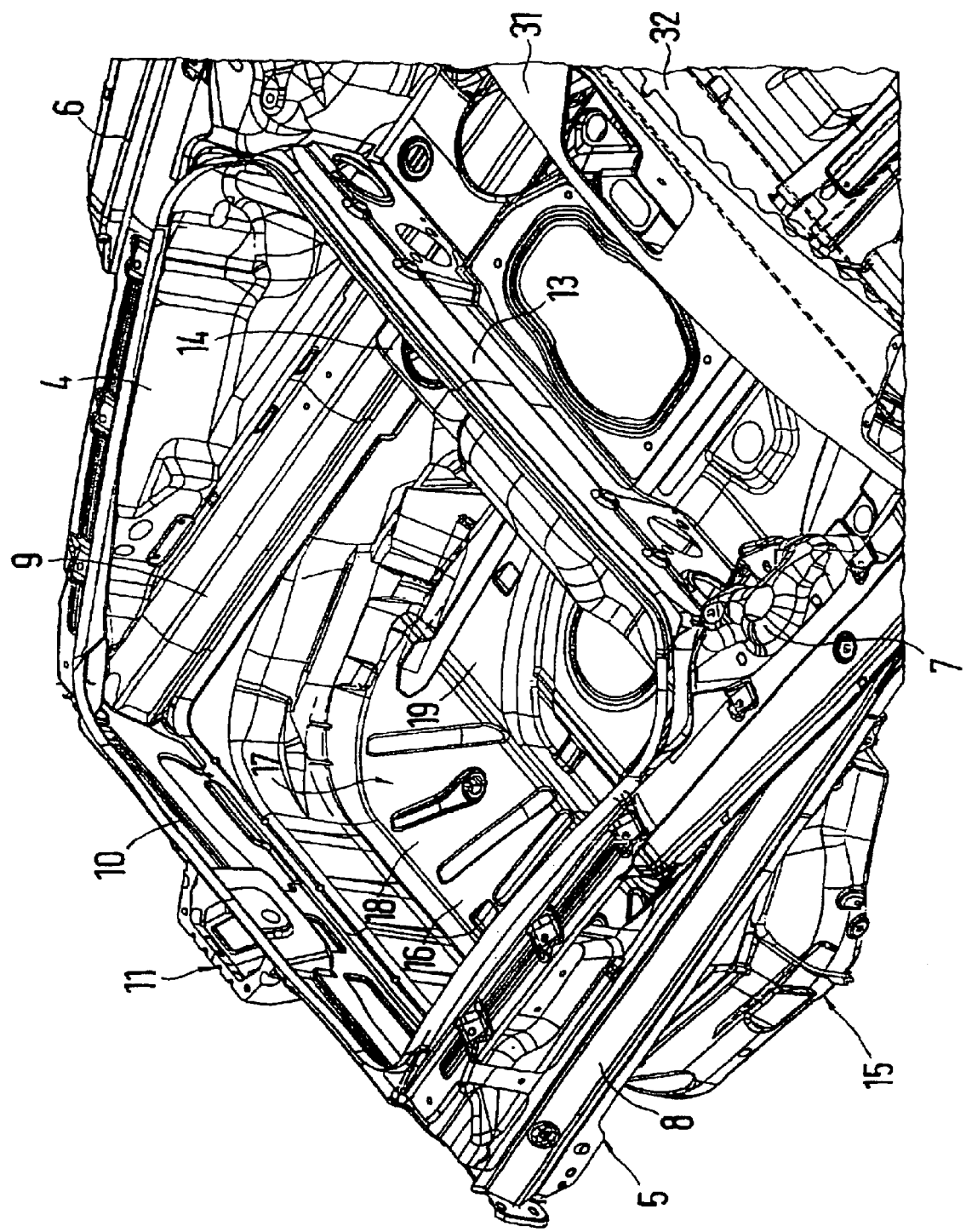
FIG. 3 is a perspective partial view of the area of the configuration of FIG. 1 with the frontal longitudinal beams installed in front of the dashboard, FIG. 4, a diagonal perspective view from the back onto the building structure with the tubular frame of the configuration of FIG. 1.
Figure 4:
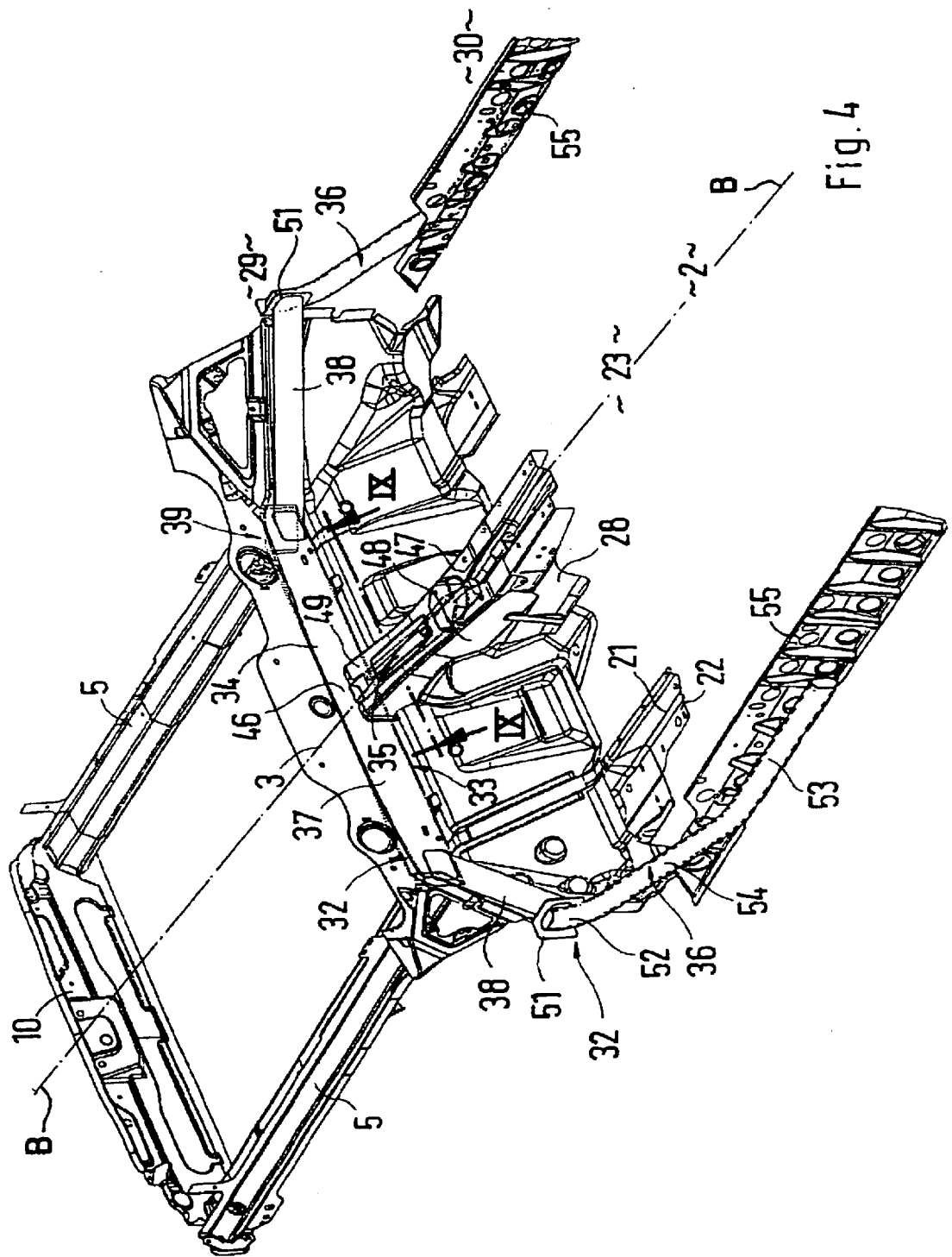

The lower front longitudinal beam 5—in the cross section—in the form of approximately six or eight angles, consists of an outer support section 8 and an inner support section 9, which form a closed hollow body (FIGS. 1–3).

At least the inner support section 8 of the front longitudinal beam 5 is realized in tailored blank construction, whereby the thickness of the wall increases incrementally towards the dashboard 3. The outer support section 9 can be realized in that manner as well. Thereby a defined, clean folding of the lower front longitudinal beams 5 is guaranteed in case of a head-on collision. The two lower front longitudinal beams 5 are connected with each other by a hollow-beam-type cross member 10, which consists of two saucer-type molded sheet metal parts. In a central area of the lateral extension of the cross member 10, a lock seat 11 is installed for a front hood which is not shown in greater detail.

Both longitudinal beams 5 each exhibit a seat 12 at the front ends for crash dampeners of a bumper system which is not shown in great detail. In the area of a bulkhead 13 adjacent the dashboard 3, another cross member 14 is provided, which is connected on the exterior with the adjacent lower front longitudinal beams 5. The cross member 14 is also realized by two molded sheet metal parts assembled to form a hollow beam.

A trunk trough 15 extends downwards, framed by the two front longitudinal beams 5 as well as the cross members 10 and 14. According to FIG. 3 the trunk trough 15, on the side not facing the road—as seen from a top view—exhibits a U-shaped spacer 16, so that an energy absorbing, sandwich-shaped floor structure 17 is created in the area of the trunk trough 15. The spacer 16 exhibits a lateral running front area 18 and a lateral lengthwise limb 19. The double-walled floor structure 17 acts as a lower load plane in the case of a head-on collision.

Seen in side view, the longitudinal beams 5 extend, approximately horizontally aligned, from the front cross member 10 through to the dashboard 3.

From the dashboard 3 the longitudinal beams 5 extend downwards and are connected to a lower-lying lengthwise-directed floor beam 21 via a connecting beam 20. The floor beam 21 is realized by a cap-shaped sheet metal profile 22, which is seated on the bottom side of the floor 23. The connecting beam 20 is connected to the dashboard 3 with its rear end, and consists of a one-piece mold 24 of the outer support section 8 of the longitudinal beam 5 and a separate profiled support sheet metal part 25.

The connecting beam 20 could, however, also be realized in one piece with the longitudinal beam 5 or the floor beam 21. Seen in a top view, the connecting beam 20 and the following floor beam 21 run in rectilinear extension of the front longitudinal beam 5. Rear ends of the floor beams 21 extend to a seat cross member 26, which is located on the topside of the floor 23, or protrudes toward the rear.

The lateral running dashboard 3, in a central area of its transverse extension, exhibits a recess 27, to which a lengthwise center tunnel 28 is connected. On its lateral exterior ends, the dashboard 3 is connected to the respective adjacent upright A-column 29, that is, at its interior side. The upright A-columns 29, with their lower ends, are seated on lateral exterior horizontal frontwalls 30. Each upper longitudinal beam 6 is connected to the corresponding A-column 29 and exhibits a hollow-frame-type structure from the A-column 29 up to shortly before the spring seat 7. More to the front, only an angled flange forms the continuation, onto which removable adjacent fenders are attached; this is not shown in detail. At the level of the upper longitudinal beams 6 the two A-columns 29 are connected with each other by means of a cowl cross member 31.

A good power discharge from the lower front longitudinal beams 5 into the adjacent configuration 1 is achieved in that the two front rectilinear longitudinal beams 5 are carried through up to the dashboard 3 and are connected as power-transmitters connected with it. At the level of the lower front longitudinal beams 5, on the side facing the passenger compartment 2, a support structure 32 is planned, which connects the two front longitudinal beams 5 with the upright A-columns 29, the low-lying doorsills 30, the dashboard 3, as well as the center tunnel 28 as power transmitters.

According to the invention, the support structure 32 is formed of a rigid tubular frame 33. Preferably, the rigid tubular frame 33 is produced from high-rigidity material, and includes a horizontally aligned cross tube 34 formed in one or several parts, which is effectively supported via a central support tube 35 and lateral support tubes 36 at the configuration 1. The cross tube 34 comprises a rectilinear transverse running center part 37 and two side parts 38, which are connected to it diagonally. The side parts 38 extend from the lateral ends of the center part 37 diagonally to the exterior and rear to the adjacent A-columns 29. The center parts 37 and the two side parts 38 of the cross tube 34 can be realized in one piece.

Figure 5:
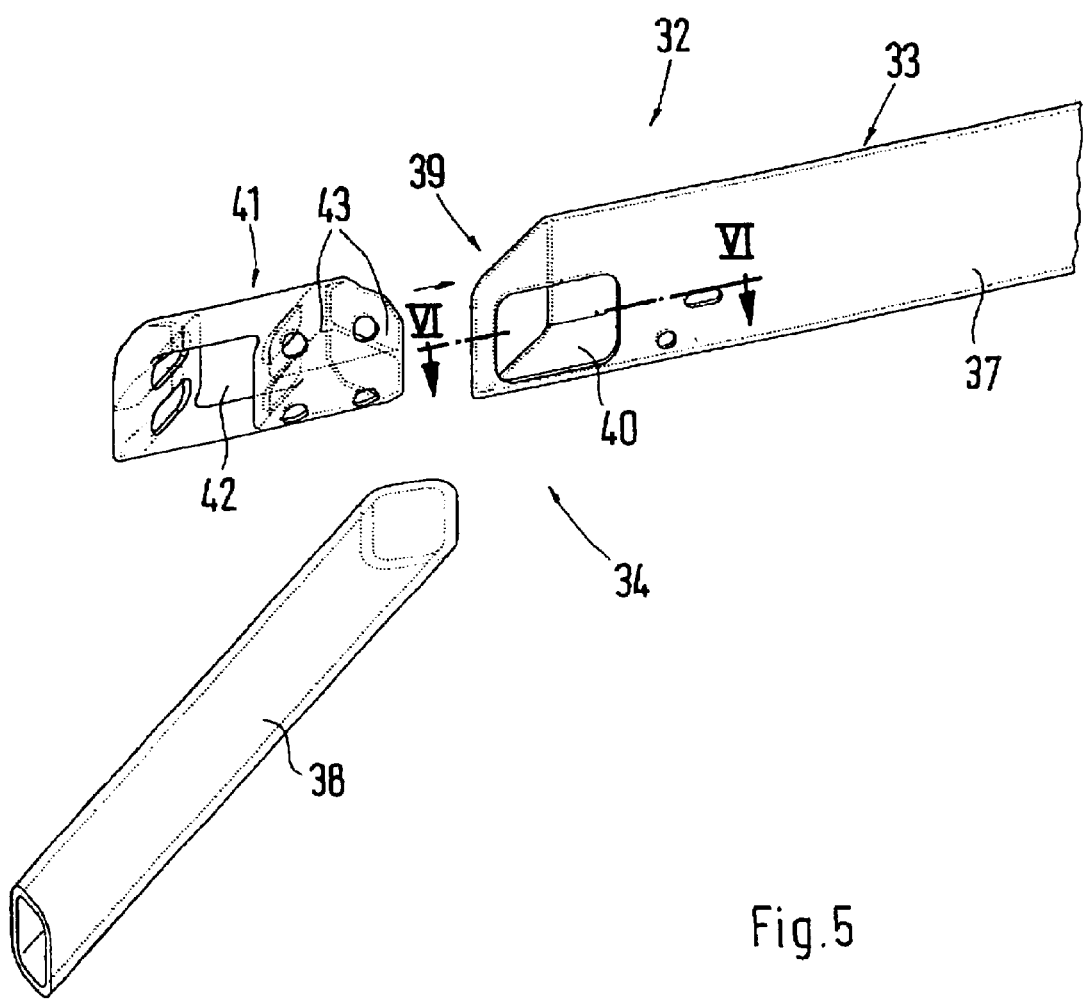
FIG. 5 is an exploded view of the components of the cross tube of the tubular frame of the configuration of FIG. 1.

In a preferred embodiment (FIG. 5), the center part 37 and the two side parts 38 are realized by separately produced tubes, which are firmly connected with each other in common connecting areas 39. According to FIG. 5, the center part 37 and the side parts 38 of the cross tube 34 exhibit different dimensions. The two side parts 38 and the center part 37 exhibit a similar polygonal cross-sectional form. In the illustrated embodiment, the center part 37 and the side parts 38 are formed of high-rigidity rectangular tubes. The cross section of the cross tube 34 might, however, also be realized as square, trapezoid, octagonal and the like. The side parts 38 have a smaller cross section, and above all a smaller building (vertical) height than the center part 37. The two center parts 38 are carried through openings 40 of the center part 37 in the common connecting areas, and reach into the interior hollow space of the center part 37.

Figure 6:
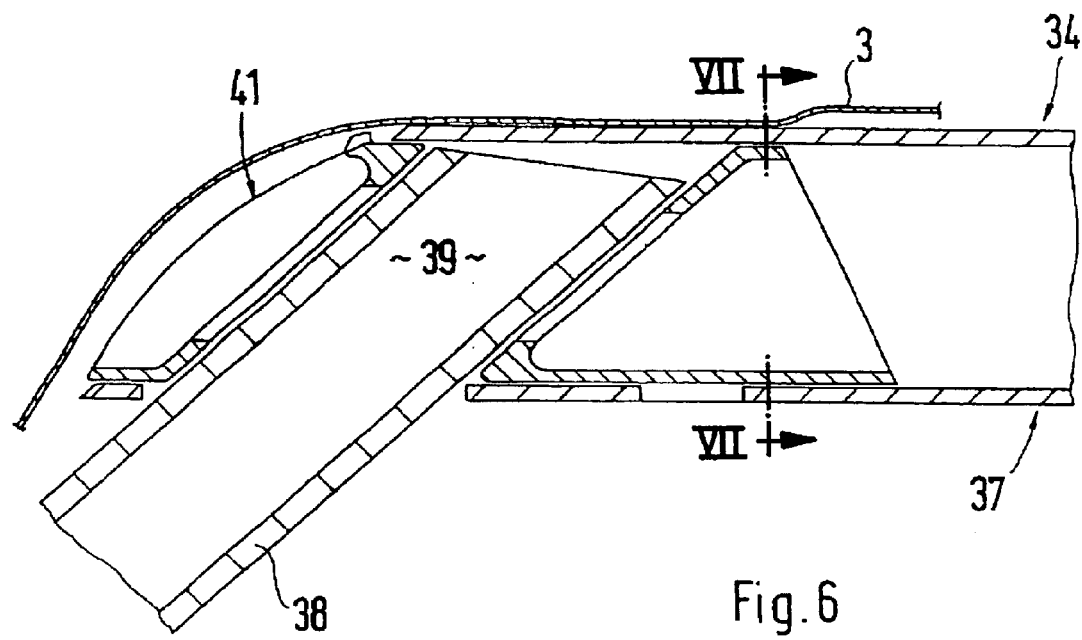
FIG. 6 is a horizontal section of an enlarged view taken along line VI—VI of FIG. 5, showing the cross tube in the connecting area of the center part and lateral part and in a connected condition.
Figure 7:
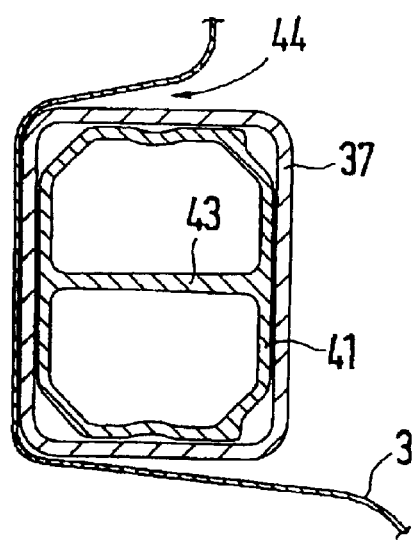
FIG. 7 is a section taken along line VII—VII of FIG. 6 in a magnified view.

In order to increase the energy absorption, in each connecting area 39, cast nodes 41 are seated into the center part 37 from the open exterior side; whereby the cast nodes on the one hand exhibit corresponding seat sections 42 for the adjacent side part 38, and on the other hand, are nested in a form-fitting manner at the center part 37. Each cast node 41 is welded to the center part 37 in sections. The respective side part 38 is seated into the lengthwise seat sections 42 of the cast node 41, and is welded with these and the center part 37. The receiving sections 42 guarantee large-surface guidance of the inserted side parts 38. Each cast node 41 additionally exhibits stiffening ribs 43 (FIG. 6). For space-saving placement of the cross tube 34, a diagonal, step- or recess-shaped seat 44 is provided in the dashboard 3, which seat 44 is open-faced towards the passenger compartment 2 (FIG. 7).

The cross tube 34 is seated into this seat 44. The cross tube 34 may fully extend within the seat 44, or may protrude slightly in certain areas towards the passenger compartment 2. In the illustrated embodiment, the seat 44 exhibits an approximately U-shaped cross section. The cross tube 34 runs with a very small gap to the adjacent seat 44 heightwise and lengthwise. Nearby the two front longitudinal beams 5, the cross tube 34 is firmly connected with the seat 44 on the upper as well as the lower side, by means of at least one CO2-weld seam.

Figure 8:
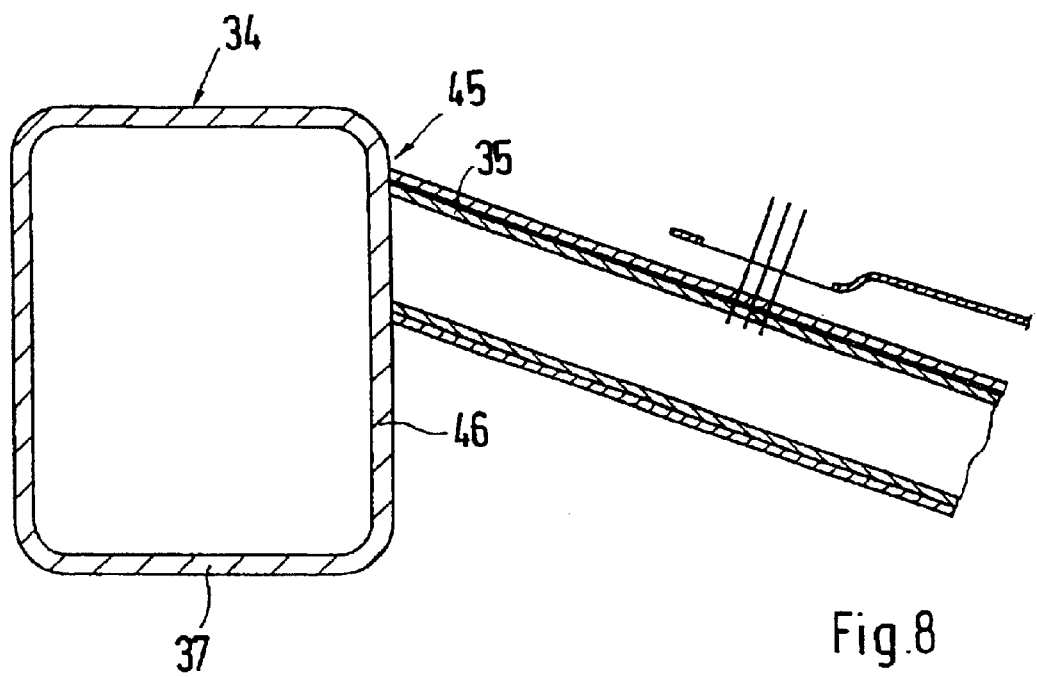
FIG. 8 is a section taken along line VIII—VIII of FIG. 10 in a magnified view.
Figure 9:
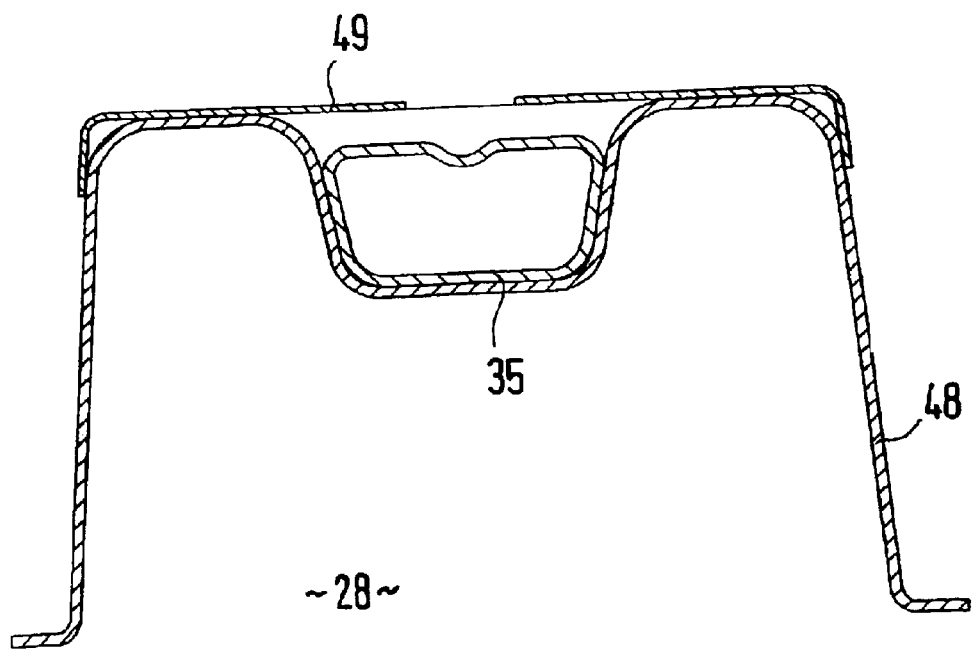
FIG. 9 is a section taken along IX—IX of FIG. 4 in a larger view.
Figure 10:
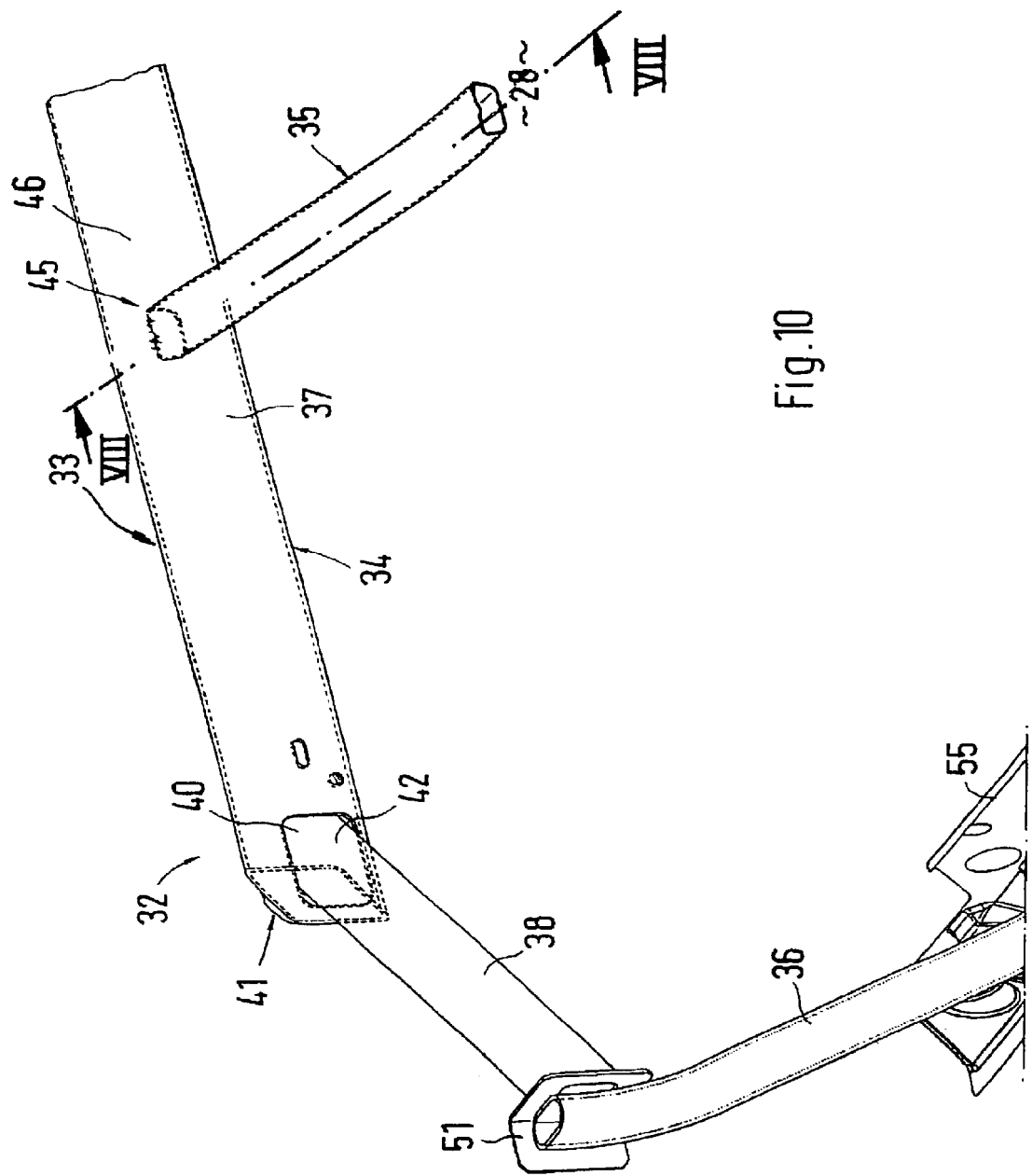
FIG. 10 is a perspective view from diagonally under a partial region of the tubular frame.

In the area of the central longitudinal plane B—B, the cross tube 34 is connected as a power transmitter with the center tunnel 28 via the center support tube 35. The upper end 45 of the center support tube 35, is welded to the passenger compartment 3 facing wall of the cross tube 34 or the center part 37 (FIG. 8), whereas the lower end 47 of the support tube 35 is firmly connected with the top side of the mounted tunnel reinforcement 48 (FIG. 9). The diagonally running center support tube 35 extending in lengthwise vehicle direction (A—A), exhibits an approximate trapezoid cross section. Towards the top, the support tube 35 is cased by means of an edge plate (FIG. 9). The tunnel reinforcement 48 with the edge plate 49 and the center support tube 35, serve as frontal crash supports.

The cross tube 34 or its side parts 38, are carried through to recesses 50 of the adjacent A-columns 29 with their free lateral ends, and are firmly connected with an angular A-column reinforcement 51, which extends in the interior of the A-column 29. The A-column reinforcement is in the interior side welded to the not in more detail shown inner metal plate of the A-column 29, not shown here in great detail. Additionally, the free end of the side part 38 is connected with the A-column reinforcement 51 by means of welding. The lateral support tubes 36 for the support of the A-columns 29 to the lower-lying frontwalls 30, are aligned in lengthwise vehicle direction, and extend completely inside the A-columns 29, or the frontwalls 30. In the embodiment shown, each lateral support tube 36 has an oval cross section, whereby the longer sides extend in the lengthwise direction of the vehicle. According to FIG. 4, each lateral support tube 36 comprises a vertical, upward facing front end area 52, a horizontally aligned rear end area 53 and a diagonally running center area 54, which connects the end areas 52, 53 with one another. The vertically aligned front or top end area 52 of the support tube 36, is welded with the side not facing the cross tube 34, on the inner-lying A-column reinforcement 51, whereas the other horizontally running end area 53 of the support tube 36 is firmly connected to the exterior of an inside-lying doorsill-reinforcement 55, for example, by means of welding. In the embodiment shown, the rear end area 53 of the support tubes 36 extends to approximately the center area of the longitudinal extension of the seat cross member 26. On the floor 23, carried in front of the seat cross member 26, are passenger-side Y-shaped reinforcements 56, which are connected with the floor 23, the dashboard 3, the doorsill 30 and the center tunnel 28. The reinforcements can be formed in one piece with the seat cross member 26, or can be formed as separate molded sheet metal parts. The front cross member 10, the cross member 14 adjacent to the bulkhead 13, and the cross tube 34 of the tube frame 32 preferably run at the same level. The two lower front longitudinal beams 5, the dashboard 3, and the tubular frame 33 connected with the A-column 29, the frontwalls 30 and the center tunnel 28, form a center load plane in case of a head-on collision, whereby the center load plane forms the main load plane. The top longitudinal beams 6, which are connected with the A-columns 29 and the cowl cross member 31, form an upper load plane.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Configuration of a passenger car comprising:
    a dashboard installed between a front of the car and the passenger compartment;
    at least two front longitudinal beams that are connected to the dashboard at a distance from each other;
    lateral exterior frontwalls,
    a floor and upright A-columns, and
    a support beam structure provided in an area of the dashboard by means of which the front longitudinal beams are connected as power transmitters to the upright A-columns, the frontwalls, and the dashboard,
    wherein the beam structure is formed by a rigid tubular frame which is installed at the passenger compartment facing side of the dashboard, said tubular frame being connected at least with the dashboards the A-columns and the frontwalls.

2. Configuration according to claim 1, wherein the tubular frame comprises:
    a horizontally-aligned cross tube formed in one or several parts;
    a central support tube supporting the cross tube; and
    lateral support tubes supporting the cross tube.

3. Configuration according to claim 2, wherein the tubular frame is produced from high-rigidity material.

4. Configuration according to claim 2, wherein the cross tube comprises a transverse running center part and inclined side parts.

5. Configuration according to claim 4, wherein the center part and the inclined side parts of the cross tube are formed in one piece.

6. Configuration according to claim 5, wherein the side parts are lead through openings in the center part and reach into the interior of the center part.

7. Configuration according to claim 5, wherein, in common connecting areas of the side parts with the center part, respective cast nodes are seated into the center part, which, on the one hand, nest with the side part and which, on the other hand, are nested in a form-fitting manner in the center part.

8. Configuration according to claim 4, wherein the center part and the two side parts are formed by separate tubes, which are firmly connected with each other in common connecting areas.

9. Configuration according to claim 8, wherein the center part and the side parts of the cross tube exhibit different dimensions.

10. Configuration according to claim 9, wherein the two side parts exhibit a smaller cross section and a smaller vertical height than the center part.

11. Configuration according to claim 8, wherein the side parts are lead through openings in the center part and reach into the interior of the center part.

12. Configuration according to claim 8, wherein, in common connecting areas of the side parts with the center part, respective cast nodes are seated into the center part, which, on the one hand, nest with the side part and which, on the other hand, are nested in a form-fitting manner in the center part.

13. Configuration according to claim 4, wherein the side parts are lead through openings in the center part and reach into the interior of the center part.

14. Configuration according to claim 4, wherein, in common connecting areas of the side parts with the center part, respective cast nodes are seated into the center part, which on the one hand, nest with the side part and which, on the other hand, are nested in a form-fitting manner in the center part.

15. Configuration according to claim 14, wherein the cast nodes locally exhibit stiffening ribs and lengthwise seat sections for the side parts.

16. Configuration according to claim 14, wherein the respective cast nodes are welded to the center part, and wherein the side parts, which are seated in the respective cast nodes, are welded to the respective cast node and the center part.

17. Configuration according to claim 2, wherein, at the dashboard, a transverse running step- or recess-shaped seat is provided, into which seat the cross tube reaches at least in sections.

18. Configuration according to claim 2, wherein the cross tube is lead with its lateral ends through openings of the respective A-columns, and is firmly connected with an A-column reinforcement in an interior of the A-column.

19. Configuration according to claim 2, wherein the lateral support tubes are aligned in a lengthwise vehicle direction, and completely extend inside of the A-columns or the frontwalls.

20. Configuration according to claim 2, wherein each lateral support tube comprises a vertically upward reaching front end area, an approximately horizontally aligned rear end area, and an inclined center area which connects the two end areas with each other.

21. Configuration according to claim 20, wherein the vertically-aligned front end area of the support tube is connected with an interior A-column reinforcement, whereas the other horizontally extending end area of the support tube is connected with an interior frontwall reinforcement.

22. Configuration according to claim 20, wherein the lateral support tubes exhibit an oval cross section.

23. Configuration according to claim 20, wherein the cross tube and the central support tube exhibit a polygonal cross section.

24. Configuration according to claim 2, wherein the lateral support tubes exhibit an oval cross section.

25. Configuration according to claim 2, wherein the cross tube and the central support tube exhibit a polygonal cross section.

26. Configuration according to claim 25, wherein the central support tube is, on one end, firmly connected with the cross tube and, on the other end, with a placed-on tunnel reinforcement.

27. Configuration according to claim 2, wherein the central support tube is, on one end, firmly connected with the cross tube and, on the other end, with a placed-on tunnel reinforcement.

28. Configuration according to claim 2, wherein the front longitudinal beams are connected as power transmitters with each other via a front hollow-beam-type cross member and another cross member which is connected to a bulkhead.

29. Configuration according to claim 28, wherein the interior support sections of the lower front longitudinal beams are formed in tailored blank construction, whereby the thickness of the wall of the support sections increases towards the dashboard.

30. Configuration according to claim 1, wherein the tubular frame is produced from high-rigidity material.

31. Configuration according to claim 1, wherein the front longitudinal beams are connected as power transmitters with each other via a front hollow-beam-type cross member and another cross member which is connected to a bulkhead.

32. Configuration according to claim 31, wherein the interior support sections of the lower front longitudinal beams are formed in tailored blank construction, whereby the thickness of the wall of the support sections increases towards the dashboard.

33. Configuration according to claim 1, wherein the tubular frame includes a tube section extending at least partly into a recess in one of the A-columns.

34. A method of making the configuration of claim 1, comprising welding the tubular frame parts together.

35. A method of making the configuration of claim 14, comprising welding the cast node to the center part and the side part.

36. A beam structure for a passenger vehicle of the type having a dashboard installed between an end of the vehicle and a passenger compartment, and A-columns at opposite lateral sides of the dashboard, said beam structure including a rigid tubular frame installed at a passenger compartment facing side of the dashboard, said tubular frame being connected with the dashboard and the A-columns.

37. A beam structure according to claim 36, wherein the tubular frame comprises:

a horizontally-aligned cross tube formed in one or several parts;

a central support tube supporting the cross tube; and lateral support tubes supporting the cross tube.

38. A beam structure according to claim 37, wherein the cross tube comprises a transverse running center part and inclined side parts.

39. A beam structure according to claim 38, wherein, in common connecting areas of the side parts with the center part, respective cast nodes are seated into the center part, which, on one end, nest with the side part and which, on the other end, are nested in a form-fitting manner in the center part.

40. A beam structure according to claim 39, wherein the respective cast nodes are welded to the center part, and wherein the side parts, which are seated in the respective cast nodes, are welded to the respective cast node and the center part.

41. A method of making a beam structure according to claim 39, comprising welding the support tubes and cross tube together.

42. A beam structure according to claim 36, wherein the tubular frame includes a tube section extending at least partly into a recess in one of the A-columns.

* * * * *